No. 612,264. Patented Oct. 11, 1898.
O. E. NATHANSOHN.
TIRE FOR CYCLES OR OTHER VEHICLES.
(Application filed Apr. 6, 1898.)
(No Model.)
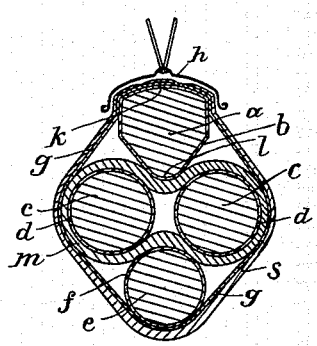

UNITED STATES PATENT OFFICE.

OSKAR EMANUEL NATHANSOHN, OF COPENHAGEN, DENMARK.

TIRE FOR CYCLES OR OTHER VEHICLES.

SPECIFICATION forming part of Letters Patent No. 612,264, dated October 11, 1898.

Application filed April 6, 1898. Serial No. 676,628. (No model.)

*To all whom it may concern:*

Be it known that I, OSKAR EMANUEL NATHANSOHN, a subject of the King of Denmark, and a resident of Copenhagen, Denmark, have invented a new and useful Improvement in the Construction of Tires for the Wheels of Cycles or other Vehicles, of which the following is a full, clear, and exact description.

The object of this invention is the construction of tires for the wheels of cycles and other vehicles, these tires having the same resiliency as the pneumatic tires used hitherto, without it being necessary to fill them with compressed air. These tires therefore present the great advantages of doing away with all pumping and not being affected by puncture.

The invention is illustrated on the accompanying drawing, that represents a section through the tire.

The inner periphery of the tire consists of a ring $a$, made of wood or of some other firm material. The section of this ring is approximately triangular and the ring can, if necessary, lie inclosed in a cover $b$ of canvas or rubber. The ring is arranged in such a manner that its inner surface $k$ lies against the rim $h$ of the wheel, while the projecting edge $l$ turns the other way. Outside the ring $a$ are arranged two rings $c$, lying side by side, at a small distance from each other, which rings consist of short cylinders made of cork, rope, or some other suitable material and forming one the prolongation of the other. The extremities of these short cylinders may be rounded off to make it easier for them to form a continuous ring. Each of these rings $c$ is inclosed in a cover $d$ of canvas or rubber, and both rings are placed inside a tube $m$ made of fine rubber and having a suitable diameter. Outside this tube and forming the outer periphery of the tire another ring $e$ may be arranged, which ring is made of cork cylinders, like the rings $c$, and inclosed within a cover $f$. The cork cylinders in the ring $e$ are of a smaller diameter than those used for the rings $c$. The ring $c$ may, however, also consist, for instance, of a solid-rubber ring that can either be independent of the outer envelop or form a part of same. All the above-mentioned rings, &c., are inclosed within an envelop $s$, the inner surface of which is covered and vulcanized together with canvas or a similar material $g$, whereby the different parts are kept in their relative positions to each other.

The rings $c$, instead of being inclosed in a tube $m$, as shown on the drawings, may be inclosed in a covering made in two halves, the edges of one of these halves overlapping the edges of the other on the sides of the tire, and being at this place vulcanized together and also vulcanized partly with the covering $d$ and partly with the inside covering $q$ of the envelop $s$ on the places where these coverings adjoin the edges of the two above-mentioned halves.

The finished tire is fixed to the rim $h$ of the wheel in the ordinary manner. If a pressure is transmitted through the rim, the edge $l$ of the ring $a$ and the ring $e$ will endeavor to enter between the two rings $c$. These two rings will therefore have a tendency of moving away from each other, which action, however, is counteracted by the elastic rubber tube $m$. This tube is thus caused to expand or draw together, respectively, whereby the tire gets the same resiliency as if it were filled with compressed air. Furthermore, as the cork cylinders are elastic in themselves the rings consisting of these cork cylinders will still increase the general resiliency of the tire.

The tire above described may also be used with the ring $e$, such construction, it will be seen, clearly coming within the scope of my invention.

Having now particularly described and ascertained the nature of this said invention and in what matter the same is to be performed, I declare that what I claim is—

1. A tire for cycles and other vehicles, characterized by a ring $a$ of a polygonal, usually triangular section, made of wood or some similar material, the said ring $a$ being placed around the rim $h$ of the wheel and having a projecting edge $l$ forming its outside periphery—in combination with two rings $c$ arranged side by side at a small distance from each other and placed outside the ring $a$, the said rings $c$ consisting of short cylinders of cork, rope or some similar material, each row of these cylinders being inclosed within a covering $d$, while both rings c are inclosed within either a tube m of fine rubber or within a covering made of two halves, the edges of one of these halves overlapping the edges of the other and being vulcanized together, all the parts mentioned being inclosed within an envelop s, substantially as described.

2. A tire consisting of an inner rigid ring, two additional rings arranged outward from the inner ring and on each side thereof, an elastic tube inclosing said additional rings and engaging the adjacent side of the inner ring, a non-elastic ring lying outside the last-named rings and between the same, being in engagement with the elastic tube on the side thereof exactly opposite that engaging the inner ring, and an envelop inclosing all the above-named rings.

3. A tire having a rim, a ring encircling the rim and formed of rigid material and two additional rings lying outside of the first-named ring and one on each side thereof, and a tube inclosing the two additional rings.

4. A tire having a rigid inner ring, two additional rings lying outward therefrom and one on each side thereof, and a member inclosing the said additional rings and bearing at one side against the inner ring.

5. A tire having an inner ring, a rim against which the inner ring bears, two additional rings arranged outward from the inner ring and one on each side thereof, a tube inclosing the said additional rings and bearing against the inner ring, and a fourth ring lying outside of the three first-named rings and bearing against the tube at the side opposite the side engaged by the inner ring.

6. A tire consisting of three rings, two of said rings being placed side by side, an elastic tube inclosing the two said rings, and the third ring being placed in engagement with the outside of said tube and between the other two rings, and an outer envelop inclosing all the said rings.

In testimony that I claim the foregoing as my invention I have signed my name in presence of two subscribing witnesses.

OSKAR EMANUEL NATHANSOHN.

Witnesses:
P. HOFMAN-BANG,
JULES BLOM.